United States Patent Office 3,158,623
Patented Nov. 24, 1964

3,158,623
5-NITRO-2-FURYLTHIOAMIDE
Anne Mary Von Esch, North Chicago, Ill., and William Reese Sherman, University City, Mo., assignors to Abbott Laboratories, North Chicago, Ill., a corporation of Illinois
No Drawing. Filed Mar. 1, 1963, Ser. No. 262,217
1 Claim. (Cl. 260—347.2)

This invention is concerned with the novel compound of the formula

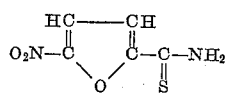

and a method for its preparation as well as compositions containing the same and their use for controlling the growth of various pathogenic fungi and bacteria. The compound 5-nitro-2-furylthioamide possesses outstanding antifungal and antibacterial properties. When employed as an active, toxic constituent of disinfectant compositions either dispersed on an inert, finely divided solid or in an inert liquid such as water or polyethylene glycol at a concentration of from 10 to 100 parts per million, this compound completely inhibits the growth of *Chaetomium globosum*, *Myrothecium verrucaria*, *Staphylococcus aureus*, *Fusarium oxysporum*, *Proteus mirabilis* and Alternaria species.

This novel compound is also an important chemical intermediate and can be employed to prepare derivatives which likewise possess antifungal, antiparasitic and antibacterial properties. In such use, equivalent amounts of 5-nitro-2-furylthioamide and bromoacetone or bromoacetophenone are heated in an ethanolic solvent to produce the corresponding thiazole of the formula

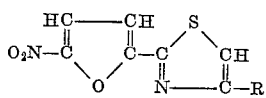

wherein R is methyl or phenyl.

The following example illustrates the preparation of the new compound but it is to be understood that other inert solvents such as tetrahydrofuran or ethylene glycol can be employed if desired.

Example 1

A solution of 13.9 grams (0.1 mole) of 5-nitro-2-furylnitrile (M.P.=64° C.) and 15.0 grams (0.2 mole) of thioacetamide in 250 ml. of dimethylformamide saturated with anhydrous hydrogen chloride was heated on a steam bath for thirty minutes. After concentrating the reaction mixture to one-half its volume, it was poured on 500 grams of ice and the brown solid which formed was removed by filtration. After recrystallization from boiling ethanol, the 5-nitro-2-furylthioamide product was obtained as a bright orange, crystalline solid which melted at 185°–187° C. with decomposition. It analyzed 35.14% carbon, 2.40% hydrogen and 16.15% nitrogen compared to the calculated values of 34.88% carbon, 2.34% hydrogen and 16.28% nitrogen.

We claim:
5-nitro-2-furylthioamide.

References Cited in the file of this patent
UNITED STATES PATENTS

| | | |
|---|---|---|
| 2,572,577 | Tissol et al. | Oct. 23, 1951 |
| 2,663,710 | Hayes et al. | Dec. 22, 1953 |
| 2,788,351 | Leonard et al. | Apr. 9, 1957 |
| 2,875,202 | Sullivan et al. | Feb. 24, 1959 |
| 2,945,047 | Sherman | July 12, 1960 |
| 2,974,084 | Mayhew et al. | Mar. 7, 1961 |

OTHER REFERENCES

Dodd et al.: J. Amer. Pharm. Assoc., vol. 39 (1950), pp. 313–5.
Swift et al.: Anal. Chem., vol. 28 (1956), pp. 146–53.
Dunlap: The Furans (1953), page 546.
Lipiec et al.: Chem. Abstr., vol. 56 (1962), column 6665h (abstract of Chem. Anal. (Warsaw), vol. 6, (1961), pp. 287–306).
Washizuka: Chem. Abstr., vol. 56 (1962), column 6 (abstract of Bunseki Kagaku, vol. 10 (1961) pp. 580–5).